United States Patent [19]
Roberson, Jr. et al.

[11] 3,921,788
[45] Nov. 25, 1975

[54] PROCESSING APPARATUS FOR THIN DISC-LIKE WORKPIECES

[75] Inventors: Glenn A. Roberson, Jr., San Jose; Robert I. Beaver, II, Menlo Park; Edward L. Kelly, Sunnyvale, all of Calif.

[73] Assignee: Macronetics, Inc., Mountain View, Calif.

[22] Filed: May 21, 1974

[21] Appl. No.: 471,872

[52] U.S. Cl. ............... 198/19; 198/219; 214/1 BB; 214/6 F; 214/6 H; 214/8.5 A; 214/301; 214/310
[51] Int. Cl.² B65G 1/06; B65G 25/04; B65G 47/06
[58] Field of Search ......... 214/16.4 R, 16.4 C, 301, 214/309, 310, 1 BB, 6 R, 6 DK, 6 F, 6 H, 8.5 R, 8.5 A; 271/1, 3, 4, 5, 6, 7, 14, 84, 267, 269; 198/19, 219, 221, 222

[56] References Cited
UNITED STATES PATENTS

| | | | |
|---|---|---|---|
| 3,179,262 | 4/1965 | Carlson et al. | 271/14 |
| 3,756,425 | 9/1973 | Wallis | 214/1 BB |
| 3,757,961 | 9/1973 | Jacobs | 214/1 BB |
| 3,812,947 | 5/1974 | Nygaard | 198/19 |

*Primary Examiner*—Richard A. Schacher
*Assistant Examiner*—Jeffrey V. Nase
*Attorney, Agent, or Firm*—Limbach, Limbach & Sutton

[57] ABSTRACT

Apparatus is provided for facilitating the processing of thin, disc-like workpieces such as silicon wafers, integrated circuit masks and the like which includes an improved slide mechanism for transferring workpieces to be processed from a workpiece-containing supply receptacle to the processing area, and thereafter to a receiving receptacle so that the transportation of a workpiece to be processed occurs at the same time that a workpiece which has already been processed is removed from the processing area. A carousel arrangement is provided for atuomatically providing new workpiece receptacles as required for fully automatic, continuous processing.

14 Claims, 13 Drawing Figures

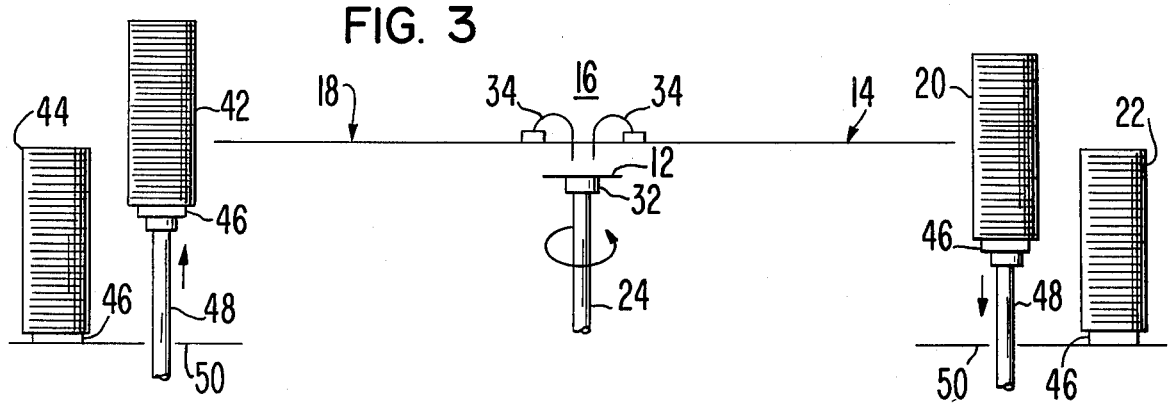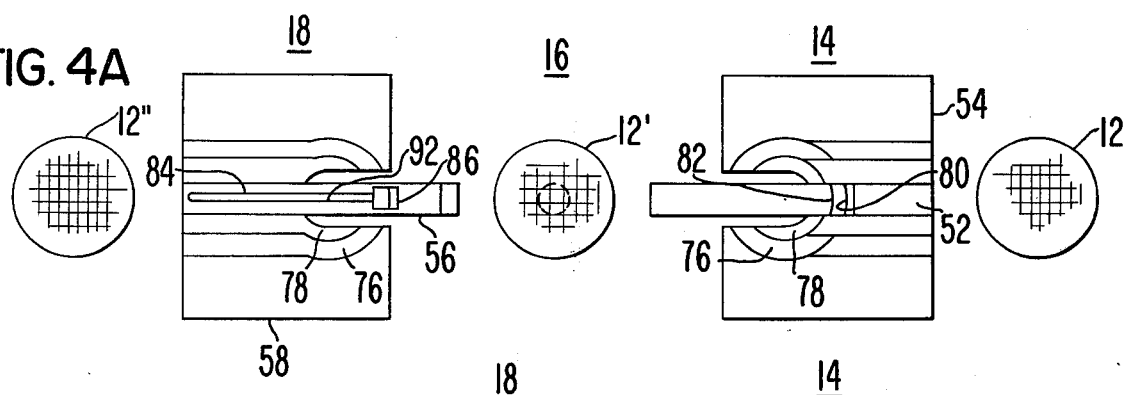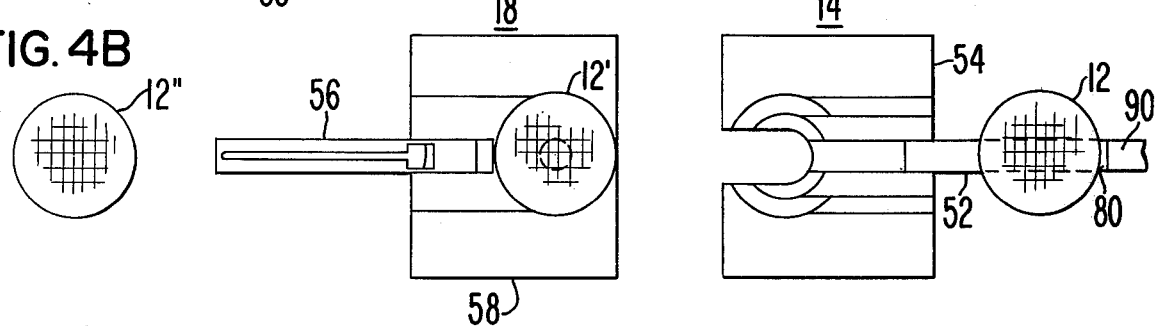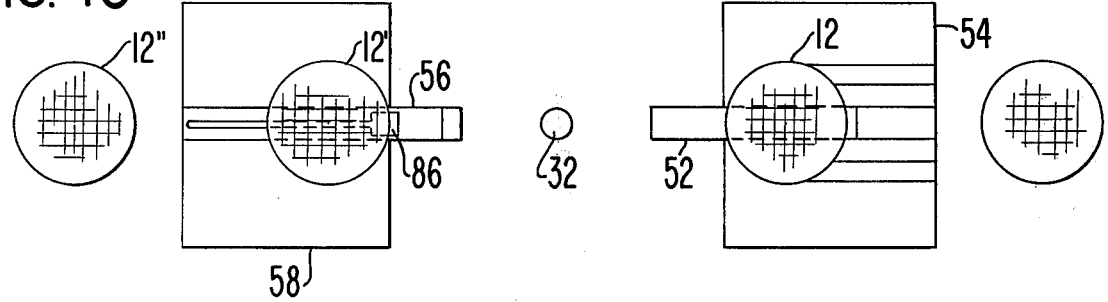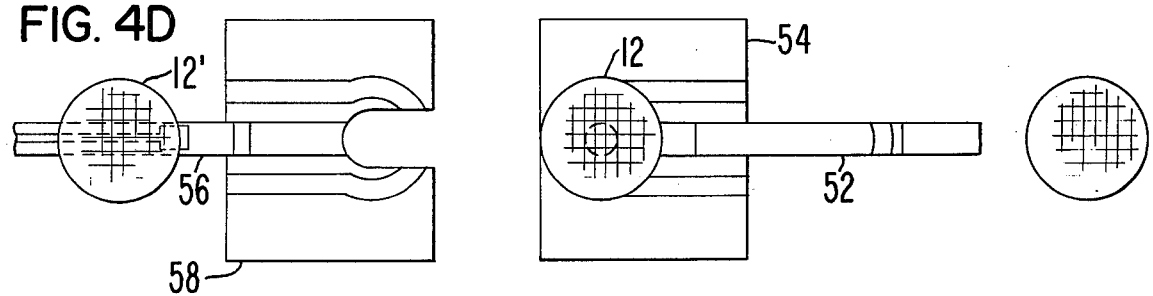

PROCESSING APPARATUS FOR THIN DISC-LIKE WORKPIECES

BACKGROUND OF THE INVENTION

The present invention relates to improved apparatus for transporting thin disc-like workpieces to and from a processing area.

Two of the basic building blocks in the fabrication of miniature integrated circuits are silicon wafers and photo-masks. The silicon wafer is a thin disc made of silicon, typically either two, three or four inches in diameter. Upon one such silicon disc, it is possible to fabricate many hundreds of micro-electronics circuits.

An essential step in the fabrication process of these micro circuits is application of a photo-sensitive material, called the photo-resist, as a thin layer on the surface of the silicon wafer. It is very important that the photo-resist layer be very thin and have a uniform thickness. This is normally accomplished by placing a silicon wafer on a rotating spindle terminated by a vacuum chuck or mandrel. The photo-resist material is applied to the surface of the wafer before or during rotation. A thin, uniform photo-resist layer results over the entire surface.

The photo-resist layer is selectively exposed to light by placing a photo-mask on top of the wafer prior to the light exposure. After removing the mask, the uncured, unexposed photo-resist material is removed by a suitable solvent leaving the pattern of the mask on the photo-resist layer on the top of the wafer. This photo-resist layer itself acts as a mask or shield in subsequent processing steps. It is common practice to apply the solvents to a wafer rotated in the manner described above for applying the photo-resist.

In the fabrication of the mask itself, a photo-resist technique is used and as a result it is also necessary to provide a thin photo-resist material on the mask plate during its fabrication. A typical mask is square in shape and is two and one-half by two and one-half inches, although larger masks are used with larger wafers.

Until comparatively recently the steps of putting the wafer or mask onto the rotating mandrel so that the photo-resist material or other wet material could be applied was done manually. More recently, several systems have been developed for semi-automatically transporting wafers to and from the processing area. However, none of these have proven to be very reliable and none have the flexibility for complete automatic processing or the ability to easily handle different size and shape workpieces.

One such system employs a gravity feed wafer transportation system. Wafers to be processed are stacked in a supply receptacle, commonly called a "boat." The boat is supported by an elevator at an angle to vertical so that a wafer within the boat is free to slide out of the boat and along an inclined ramp to the vacuum mandrel. An apertured plate is used to prevent all but one wafer from leaving the boat and the elevator is lowered incrementally to allow each of the wafers to leave the boat through the aperture. Another inclined ramp is provided so that once the wafer is processed it slides down the ramp into a receiving boat which also is at an angle to the vertical.

This system has several significant disadvantages. First, there is no "positive" feed since the motion imparted to the wafers is entirely by gravity. Secondly, the photo-resist material which is put onto the rotating wafer in the processing area frequently ends up covering all or a part of the ramp areas causing increased friction so that wafers sliding down the ramps become jammed. Third, this system is only capable, without significant modifications, of providing processing to a wafer having a single size, and cannot process photo-masks. Finally, once one boat has been emptied of wafers, a human operator must remove the empty boat and replace it with a filled boat of wafers. During this period of time, the processing of the wafers necessarily must terminate and as a result a significant delay is introduced into the fabrication sequence.

Another semi-automatic system for transporting wafers to and from the processing area utilizes an air-bearing system. Once again, the wafers are stored in receptacles. Here, however, the wafers are maintained horizontally and are transported to and from the processing area by means of an air bearing, i.e. upon a cushion of air. Like the gravity fed system, this type of mechanism has proven to be very unreliable and consists of many moving parts. The photo-resist material frequently gets into the air bearings and damages them or reduces their effectiveness. Also, this system has the same disadvantages of the gravity fed system in that only one size wafer can be transported without significant modification. Also, the system cannot operate during the time that the wafer receptacles are replaced manually.

SUMMARY OF THE INVENTION

It is, therefore, an object of the present invention to provide a fully automatic system for the continuous transportation of thin workpieces to and from a processing station.

Another object of the invention is to provide an improved apparatus for the conveyance of wafers and masks and the like to and from a processing area by means of a positive feed mechanism which is less susceptible to jamming than prior art systems.

Another object of the invention is to provide apparatus for conveying multiple sized and shaped workpieces to and from a workpiece processing area without modification of the apparatus.

In accordance with the present invention, an improved apparatus for transporting thin workpieces to and from a workpiece processing area is provided which includes a supply mechanism comprising first and second supply slides and a receiving mechanism which comprises first and second receiving slides. The first supply slide is coupled with the second receiving slide and the second supply slide is coupled with the first receiving slide so that each of these pairs of slides is ganged together and moved together.

The first supply slide is moved to a position to accept a workpiece thereon and transported to a first intermediary position where it is transferred to the second receiving slide. The second receiving slide moves at the same time as the first supply slide since they are coupled together and carries a workpiece from the supply area to a second intermediary position at the same time a first supply slide carries a wafer to be processed to the first intermediary position.

Thereafter, the wafer to be processed, which is temporarily at the first intermediary position, is transferred by the second supply slide to the processing area, and at the same time the first receiving slide transports the processed wafer from the second intermediary position to a receiving receptacle.

In the preferred embodiment of the invention, the workpieces are stored in a vertical stack in a receptacle or boat. The wafers lay horizontally and are spaced apart from each other by bins or other compartments. Wafers to be processed are stored in a supply receptacle, and wafers which have been processed are accepted and stored in a receiving receptacle.

In the preferred embodiment, a supply receptacle is incrementally lowered in a manner that the individual wafers are deposited upon the first supply slide so that it can be transported to the processing area. At the same time, a receiving receptacle is incrementally raised to move wafers from the first receiving slide after they have been processed.

In accordance with another aspect of the invention, a carousel system is provided for automatically exchanging a supply receptacle, once all of the wafers have been transported from it, with a receptacle which is filled with wafers to be processed. At the same time, another carousel is provided for automatically replacing a receiving receptacle which has been fully loaded with processed wafer with an empty receiving receptacle. This insures that wafers are continuously fed to the processing area and exhausted supply boats or filled-up receiving boats can be moved without interruption.

In the particular embodiment described, the carousel includes a platform having a plurality of apertures through which an elevator shaft passes to raise or lower the receptacle, when an aperture is aligned with the elevator shaft. Located upon each aperture is a saddle which is removable and which supports the workpiece receptacles. Means are provided for rotating the platform to sequentially align each of the workpiece receptacles with the elevator shaft. When a supply receptacle becomes emptied the platform is rotated so that a fresh, fully-loaded receptacle replaces it in alignment with the elevator shaft. At the same time, when the receiving receptacle is completely filled up, it is rotated and an empty receiving receptacle replaces it.

The transport mechanism of the present invention provides a positive feed to the wafers so that the possibility of jamming due to sticky underside of wafers, as is common in prior art semi-automatic systems, is avoided. The carousel approach to the workpiece receptacles enables truly automatic processing which avoids the problem of having to shut down the processing area during the time that it was necessary to replace the receptacles. Further, as will become apparent, the present invention provides for the transportation of multi-sized wafers as well as of rectanqular and square workpieces, such as photo-masks.

BRIEF DESCRIPTION OF THE DRAWINGS

FIG. 3 is a diagrammatic illustration of the overall operation of the workpiece transportation system of the present invention.

FIGS. 4A through 4D illustrate the action of the improved transport mechanism of the present invention for transporting workpieces to and from the processing area.

DESCRIPTION OF THE PREFERRED EMBODIMENT

Figure 1:
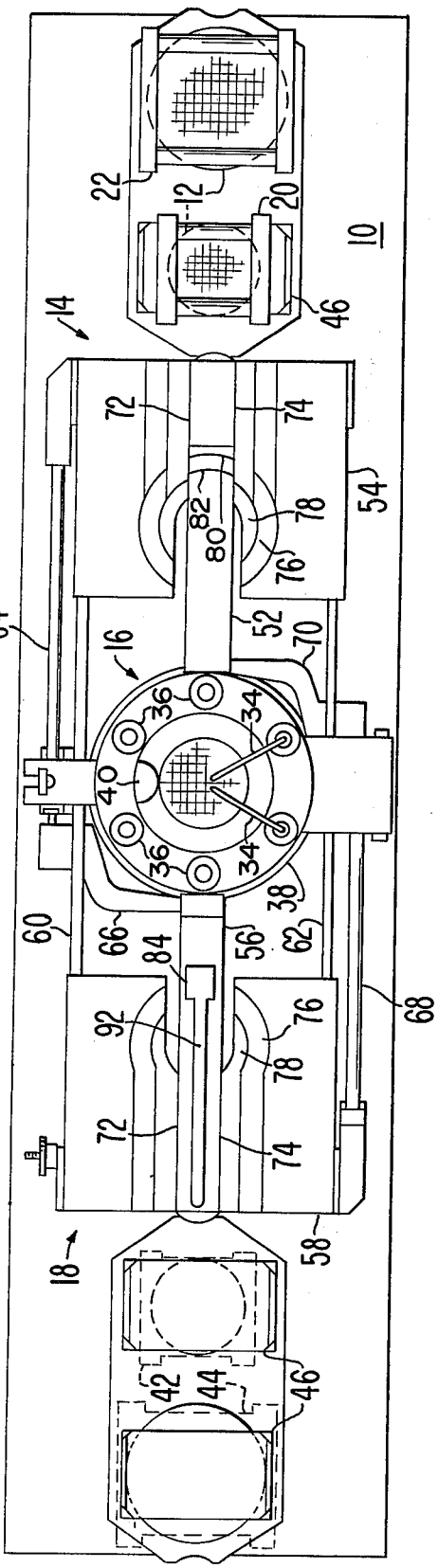
FIG. 1 is a top view of the improved workpiece transportation system of the present invention.

FIG. 1 is a top view of an improved workpiece transportation apparatus 10 in accordance with the present invention. In the following discussion of the preferred embodiment, a system for transporting silicon wafers and photo-masks is described. However, it should be kept in mind that this invention is applicable to other types of thin disc-like workpieces.

Wafers 12 to be processed are transported by a supply transport mechanism 14, in a manner to be described, to a processing area of work station 16. After a wafer 12 has been processed it is transported via a receiving transport mechanism 18 from the processing area 16.

The wafers to be processed are vertically stacked, spaced apart from one another, in supply receptacles or boats 20 and 22. It is to be noted that the wafers in the receptacle 20 have a smaller diameter than those in the receptacle 22. As will be explained, the subject transport apparatus is capable of transporting wafers of different sizes, as well as square workpieces.

Figure 2:
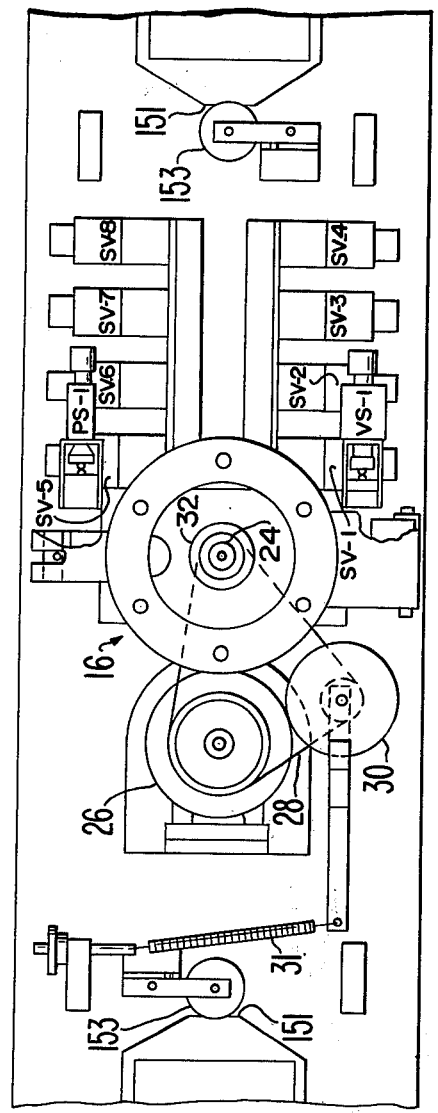
FIG. 2 is a cut-away view of a part of the transportation system of FIG. 1.

Referring additionally to FIG. 2, the processing area 16 includes a spindle assembly 24 which is rotated by a drive motor 26 by means of a pulley belt 28. An idler wheel 30 biased by spring 31 maintains tension on the pulley belt 28 to engage the drive motor 26 to rotate the spindle assembly 24. The idler wheel 30 is also used to count the number of revolutions of the spindle for purposes of controlling the spinning speed. The spindle assembly 24 is terminated by a vacuum chuck 32 which holds the wafer 12 while it is rotated.

The photo-resist or other liquid material, to be deposited upon wafer 12, is provided through one of the nozzles 34. In the embodiment described two such nozzles 34 are provided but additional nozzles may be added at the locations 36 as required.

Since the spindle assembly 24 is rotating while material is deposited upon the wafer 12, much of the liquid material is thrown off the rotating wafer. A protective cup 38 surrounds the rotating wafer to prevent the liquid material from escaping to other parts of the transport apparatus 10. Excess liquid material exits through a drain 40 in the bottom of cup 38.

Situated adjacent the receive transport mechanism 18 are a pair of receiving receptacles 42 and 44 shown in phantom. These receptacles are identical with the supply receptacles 20 and 22 respectively except that they are empty initially and are filled as processed wafers are transported from the processing area by the receiving transport mechanism 18.

Referring additionally now to FIG. 3, each of the receptacles 20, 22, 42 and 44 sits upon a removable saddle 46. The combination of the supply receptacle 20 and the saddle 46 is axially aligned with an elevator assembly 48 which is described in greater detail in connection with FIG. 5. When a fully-filled supply receptacle 20 is to be processed, the elevator shaft 48 raises the supply receptacle 20 and the saddle 46 from platform 50 until the bottommost wafer is slightly above the supply transport mechanism 14. The elevator shaft 48 is lowered a small increment so that the wafer is deposited on the supply mechanism 14 so that it can be transported to the processing area 16. The supply receptacle 20 is thereafter incrementally lowered until all of the wafers have been transported from it. At this point, the supply receptacle 20 and the saddle 46 are situated on the platform 50.

The platform 50 forms a part of a carousel arrangement for substituting a fresh or filled supply receptacle 22 for an empty receptacle 20. Carousel platform 50 is rotated so that the full supply receptacle 22 resting on its saddle 46 on platform 50 is axially aligned with the elevator shaft 48. The elevator shaft 48 is then raised once again until the bottommost wafer 22 is slightly above the supply mechanism 14 and the procedure is repeated again as it was for the supply receptacle 20.

A carousel arrangement is also provided for the receiving receptacles 42 and 44. The supply receptacle 42 initially is resting on the platform 50 when the wafers in a new supply receptacle 20 are about to be processed. The first slot of the receptacle 42 is thus positioned slightly below the receiving mechanism 18 and is moved up one increment to remove a processed wafer from the receiving transport mechanism 18. The elevator shaft is incrementally raised thereafter for each new processed wafer until it is fully raised and the receiving receptacle 42 is completely filled with processed wafers. At this point, the elevator shaft 48 is lowered, the carousel platform 50 is rotated and a new, empty receiving receptacle 44 is ready for the next batch of processed wafers.

In the embodiment described provision is made only for two workpiece receptacles on platform 50. However, platform 50 can be made to accommodate any number of workpiece receptacles, depending upon the requirements of the system.

The operation of the supply and receiving transport mechanisms 14 and 18 can best be understood by reference to FIGS. 4A through 4D, in addition to FIG. 1. The supply mechanism 14 includes an inner supply slide 52 and an outer supply slide 54. The receiving mechanism 18 includes an inner receiving slide 56 and an outer receiving slide 58. The outer slides 54 and 58 slide along a pair of guide rails 60 and 62. Outer supply slide 54 is slidably moved along the rails 60 and 62 by a pneumatic actuator 64. Attached to the pneumatic actuator 64 is a transverse arm member 66 which attaches by means of a pin to the inner receiving slide 56. Consequently, the outer supply slide and the inner receiving slide are mechanically coupled and move in unison.

The outer receiving slide 58 is slidably moved along rails 60 and 62 by means of a second pneumatic actuator 68. A transverse arm member 70 is also secured to the pneumatic actuator 68 and to the inner supply slide 52 so that the inner supply slide 52 and outer receiving slide 58 move in unison.

The outer slide members 54 and 58 are provided with slots along the surfaces 72 and 74 adjacent to the respective inner slides. The inner slides 52 and 56 have a corresponding male ridge along their edges so that the inner slides are supported and slide along the slots along edges 72 and 74.

Outer slides 54 and 58 are provided with two recessed zones 76 and 78. Similarly, the inner supply slide 52 has a first ridge 80 and a second somewhat lower ridge 82 for accomodating different size wafers. The inner receiving slide 56 is provided with a teeter mechanism 84 which is described in greater detail in FIG. 8. The teeter 84 has a high ridge 86 and a low ridge 88.

By providing the two recessed areas in the outer slides and the two ridges on the teeter and the inner supply slide, it is possible to accomodate not only wafers having two different diameters, but also square workpieces, such as a photo-mask.

The supply and receiving mechanisms 14 and 18 are shown in the home position in FIG. 4A. In FIG. 4A, a wafer 12' in the process area 16 has just been processed. The wafer 12 immediately to the right of the supply mechanism 14 is a wafer to be processed and the wafer 12'' immediately to the left of the receiving mechanism 18 has been processed and is now within the receiving receptacle 42 (not shown). The wafer 12' in the processing area 16 has been raised by the spindle assembly 24 so that it is about the level of the receiving mechanism 18. If the supply receptacle 20 were a fresh receptacle, the elevator shaft 48 would be all the way up and the elevator shaft 48 for the receiving receptacle 42 would be all the way down.

In FIG. 4B, the inner supply slide 52 is moved laterally to the right until it is completely under the wafer 12 and the ridge 80 is in a position to engage the wafer 12. The end of the inner supply slide 52 is provided with a ramp surface 90 to facilitate the passage of the slide 52 underneath the wafer 12. If the wafer was a smaller one, the ridge 82 would engage the wafer.

Since the inner supply slide 52 is coupled with the outer receiving slide 58 at the same time that the inner slide 52 passes under the wafer 12, the outer receiving slide 58 passes underneath the just-processed wafer 12'. If this was the first operation, there would not be any wafer 12' in the processing area 16.

The vacuum chuck 32 is lowered so that the processed wafer 12' is lowered onto the outer receiving slide 58 and is engaged there in the outer recess 76. At the same time, the supply receptacle elevator 58 is lowered one increment, 3/16 inch in this particular embodiment, so that wafer 12 is lowered upon the inner supply slide 52. If the wafer was a smaller one, it would be held in place in recess 78.

In FIG. 4C the inner supply slide 52 is moved laterally to the left and, since the rigde 80 engages the wafer 12, transports the wafer 12 to a first intermediary position as shown. At the same time, the outer receiving slide 58, which is coupled to the inner supply slide 52 is also moved laterally to the left, carrying the processed wafer 12' to a second intermediary position as shown.

In FIG. 4D, the inner supply slide 52 and the outer receiving slide 58 remain stationary while the outer supply 54 and the inner receiving slide 56 are moved laterally to the left. Because the wafer 12 sits within the recess 76 in the outer supply slide 54, this causes the wafer 12 to be transported from the first intermediary position to a position directly over the spindle assembly 24 and the vacuum chuck 32.

The teeter 84 is normally pivoted about point 92 and is spring loaded so that the ridges 86 and 88 are below the plane of the inner receiving slide 56. However, when there is a wafer 12' or a photo-mask in the position shown in FIG. 4C, the teeter is pivoted by a pneumatic actuator so that the ridge 86 engages the wafer 12' so that when the inner receiving slide 56 is moved to transport the processed wafer 12' to the receiving receptacle 42 the ridge 86 engages the wafer 12' to carry it to the receiving receptacle 42.

When the wafers are in the position shown in FIG. 4D, the vacuum chuck is elevated to remove the wafer 12 from the outer supply slide 54. At the same time, the receiving receptacle elevator shaft 48 is incrementally raised to pick off the processed wafer 12' from the inner receiving slide 56. Once this happens, the inner receiving slide and the outer supply slide are returned to their home position shown in FIG. 4A.

At this point the vacuum chuck is lowered, the spindle assembly is rotated with the liquid material deposited upon the wafer 12. Once the wafer has been rotated for the proper length of time, the spindle assembly is raised to a position so that the wafer is above the level of the outer receiving slide 18. The inner supply slide 52 and the outer receiving slide 58 are then moved laterally to the right as shown in FIG. 4B and the sequence illustrated in FIGS. 4C and 4D is repeated. This entire procedure is then repeated until all of the wafers in the supply receptacle have been processed and transported to the receiving receptacle.

Figure 5:
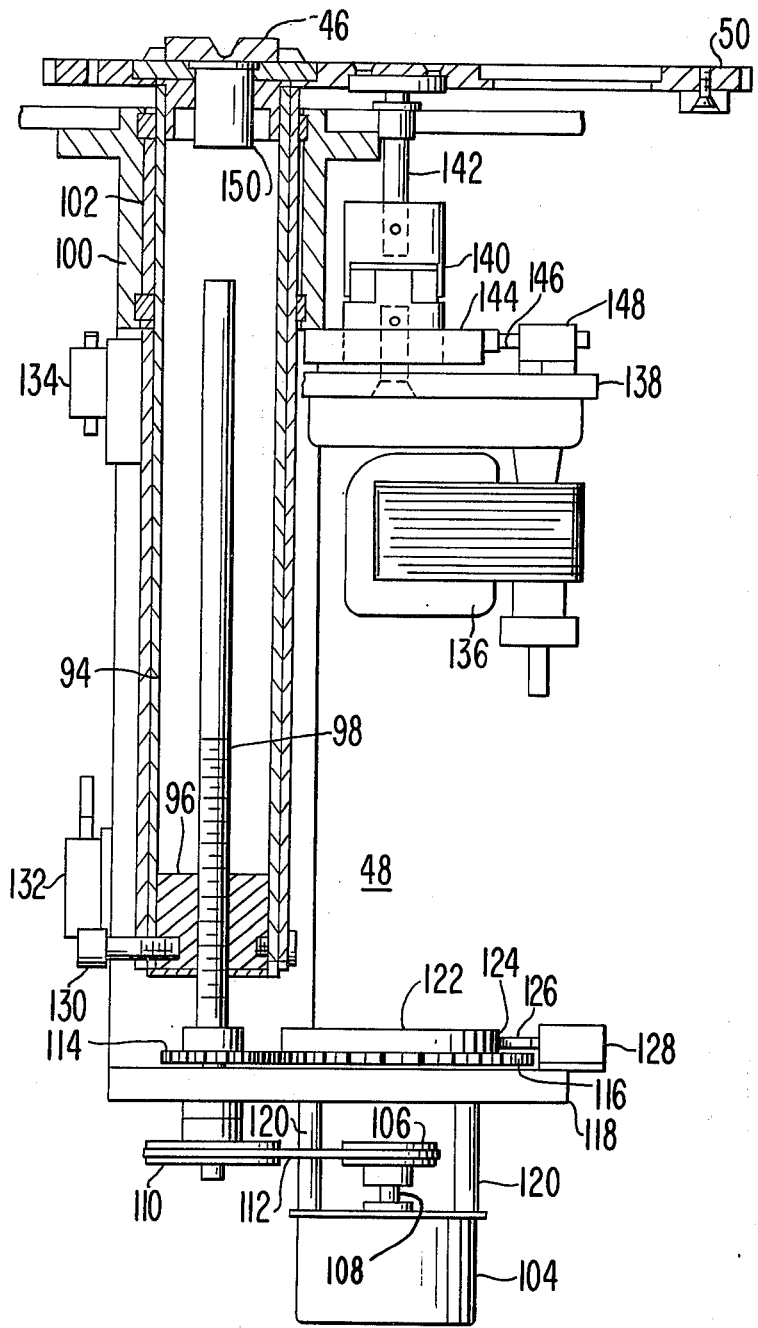
FIG. 5 is a detailed cross-sectional view of the workpiece receptacle elevator assembly and the carousel assembly.
Figure 6:
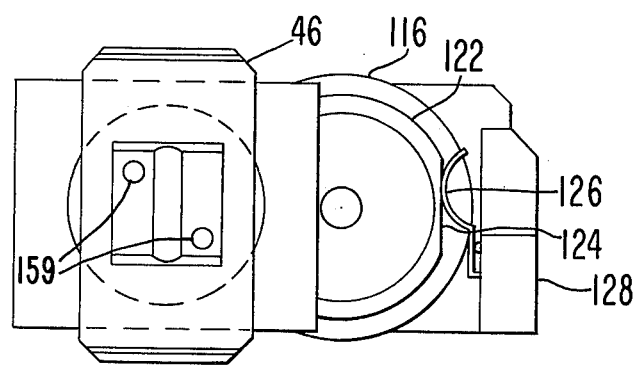
FIG. 6 is a top view, partially in section, of a part of the elevator assembly of FIG. 5.

FIG. 5 is a detailed illustration of the elevator assembly 48 and the carousel assembly. The elevator assembly 48 includes a tubular shaft or column 94 which is secured at one end to a mounting block 96. The mounting block 96 is supported on an elongated lead screw 98. A guide 100 is provided in the outer elevator assembly housing and a keyed bushing 102 cooperates therewith to prevent rotation of the elevator column 94, when the lead screw 98 is rotated. It will be apparent that when the lead screw 98 is rotated, the shaft 94 moves up or down depending upon the rotational direction of the lead screw and the pitch of the threads, since the keyed bushing in cooperation with the guide 100 prevents the shaft 94 from rotating.

The lead screw 98 is driven by a drive motor 104. A pulley 106 is connected to the drive shaft 108 of motor 104. Another pulley 110 is connected to the base of the lead screw 98. Pulley belt 112 runs between these two pulleys to rotate the lead screw 98.

As explained previously, the elevator column 94 is raised and lowered incrementally in steps of 3/16 inch in the embodiment illustrated. A sensing gear 114, on the lead screw 98, cooperates with a second gear 116 which is rotatably mounted on a support plate 118, which also acts to support the drive motor 104 through a pair of support columns 120.

The lead screw 98 has a thread pitch of 1/16 inch. Consequently, the gear ratio between sensing gear 114 and gear 116 is selected to be at a ratio of 3:1. Thus, for every three revolutions of sensing gear 114 the elevator column 94 raises 3/16 inch and gear 116 turns one revolution. A cam wheel 122 rotates about the same axis as the wheel 116. A flattened portion 124 on the cam wheel 122 cooperates with a cam follower 126 to trigger a limit switch 128 each revolution of the gear 116. The limit switch 128 controls the drive motor 104 so that each time the elevator column 94 is raised or lowered only 3/16 inch.

An actuator pin 130, attached to the elevator column 94, cooperates with a lower limit switch 132 and an upper limit switch 134 to regulate the maximum and minimum limits of travel of the spindle assembly and hence the workpiece receptacles.

The carousel assembly includes a drive motor 136 which is mounted to a plate 138. The drive shaft of motor 136 is coupled through a reduction gear system (not shown) and then through a spider coupling mechanism 140, to the carousel platform 50 through shaft 142. A cam wheel 144 is also mounted to the motor drive shaft. It cooperates with a cam follower 146 and a limit switch 148 to cause rotation of the carousel platform 50 180° when the receptacle is being replaced by another one.

A magnet 150 is supported at the very top of the elevator tube 94. Its purpose is to hold in place the saddle 46 which in turn supports the workpiece receptacle. As shown in FIG. 1, the platforms 50 are provided with a dimpled surface 151 which cooperates with a stationarily mounted wheel 153 to form a detent to position the platform correctly. A pair of dimples 159 in magnet 150 cooperate with pins in the bottom of a receptacle to properly orientate the latter.

Figure 7:
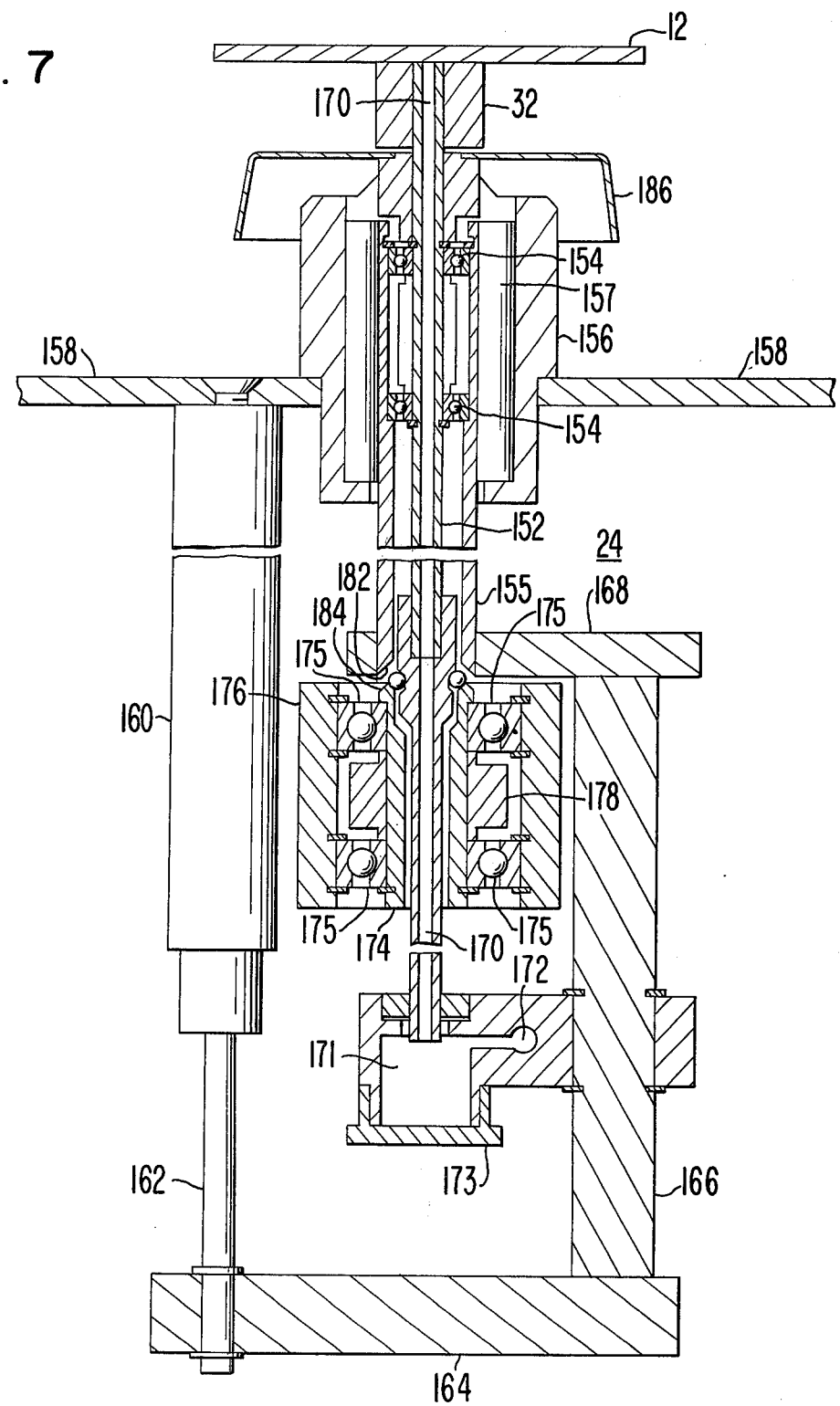
FIG. 7 is a cross-sectional detail view of the spindle assembly for rotating a workpiece.

FIG. 7 illustrates in greater detail the spindle assembly 24 and vacuum chuck 32. Spindle assembly 24 includes an inner shaft 152 which is rotatably mounted by roller bearings 154 mounted within an outer column 155.

The outer column 155 is raised and lowered by means of a pneumatic actuator 160. To facilitate this move a roller bearing 157 is mounted within a roller bearing housing 156 which in turn is supported by a support plate 158. A piston 162 activated by actuator 160 is secured to a linkage assembly comprising brackets 164, 166 and 168 to the outer column 155. Thus, when the piston is driven downwardly the column 155 is lowered; and when the piston is withdrawn into the actuator 160, the column 155 is driven upwards.

The inner shaft 152 has a central bore 170 throughout its length. This central bore 170 is connected at its lower end to a vacuum chamber 171. A vacuum inlet 172 is connected to a negative pressure source. A rubber sump cup 173 is secured at the bottom of the vacuum chamber. By introducing a negative pressure through the vacuum inlet 172 into the vacuum chamber 171 and bore 170, a wafer 12 is tightly held against the vacuum chuck 32 while it is rotated.

An outer or drive shaft 174 is rotatably mounted by ball bearings 175 enclosed within the bearing housing 176. A pulley 178 is mounted to the drive shaft 174. A drive pully belt (not shown) which passes along either side of the mounting bracket 166 is used to rotate the drive shaft 174.

The inner shaft 152 is rotated by lowering it so that the chamferred portions 182 engage similar chamferred surfaces 184 on the drive shaft 174. Thus, when the shaft 152 is lowered carrying the wafer 12 down within the processing area, the wafer is automatically rotated. Similarly, when the processing is over and the shaft 152 is raised, it is automatically disengaged from the drive shaft 174 and stops rotating.

A hood or shield 186 is used to protect the rotational mechanisms from the photo-resist or other wet processing materials. The sump cup 173 is removable so that any photo-resist material or other wet processing material can be drained easily.

Figure 8:
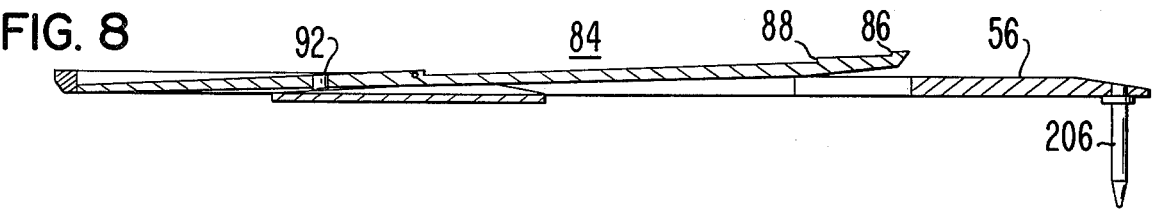
FIG. 8 is a detailed cross-sectional view of the teeter assembly.

FIG. 8 is a detailed drawing of the teeter mechanism 84. As previously explained, the teeter mechanism is only in the raised position shown in FIG. 8 when a wafer has been placed upon the inner receiving slide by the outer receiving slide, prior to its transportation to the receiving receptacle. A solenoid actuator 192 (FIG. 9 and 10) pivots the teeter to the position shown in FIG. 8. At other times, the teeter is biased by spring 194 so that the ridged portions 86 and 88 are below the level of the inner receiving slide 56. The spring 194 is shown in FIG. 10.

The teeter is only required where different diameter wafers are processed. Where only one diameter wafer is used, it can be eliminated.

Figure 9:
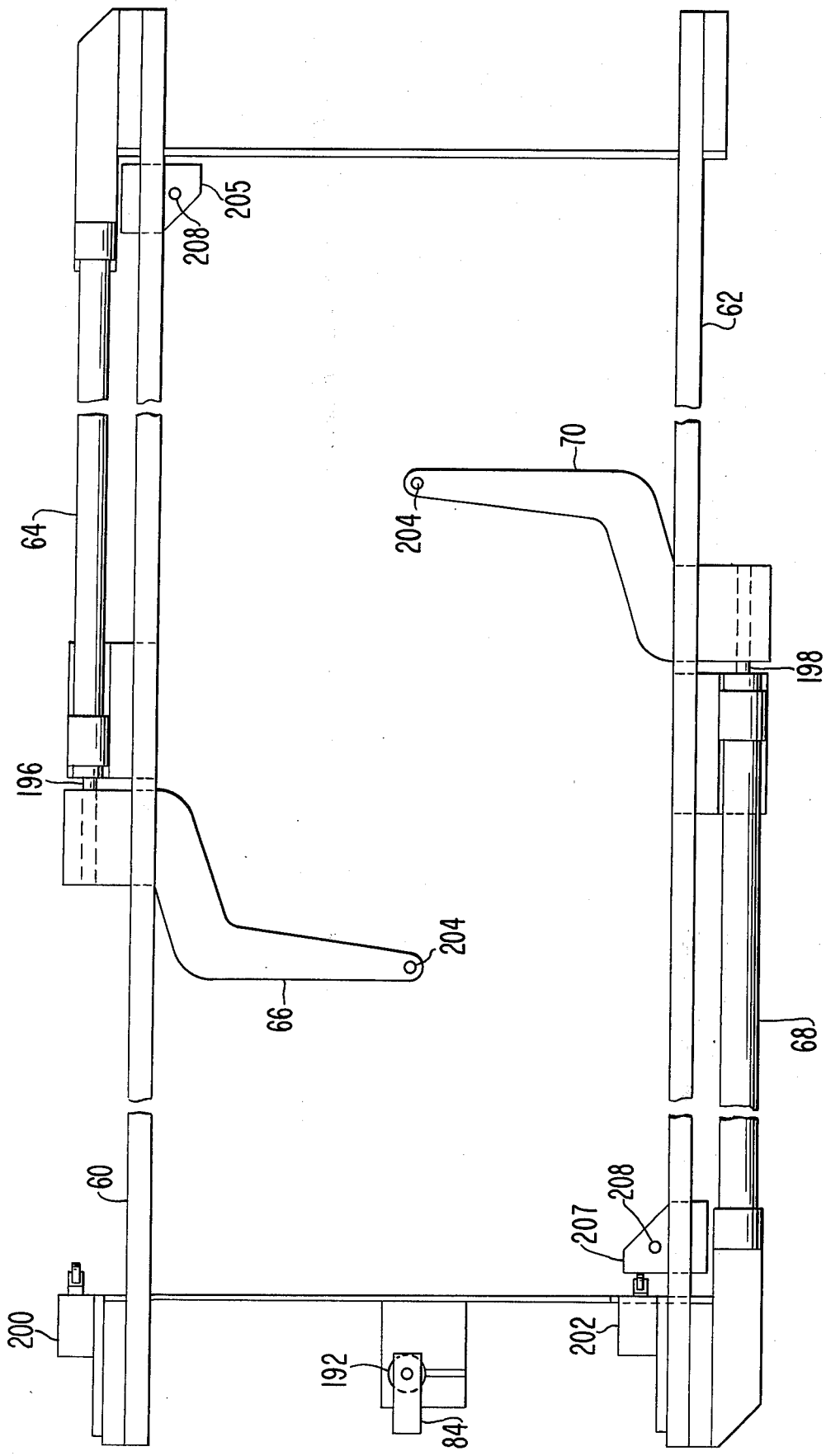
FIG. 9 is a top view of the rail assembly.
Figure 10:
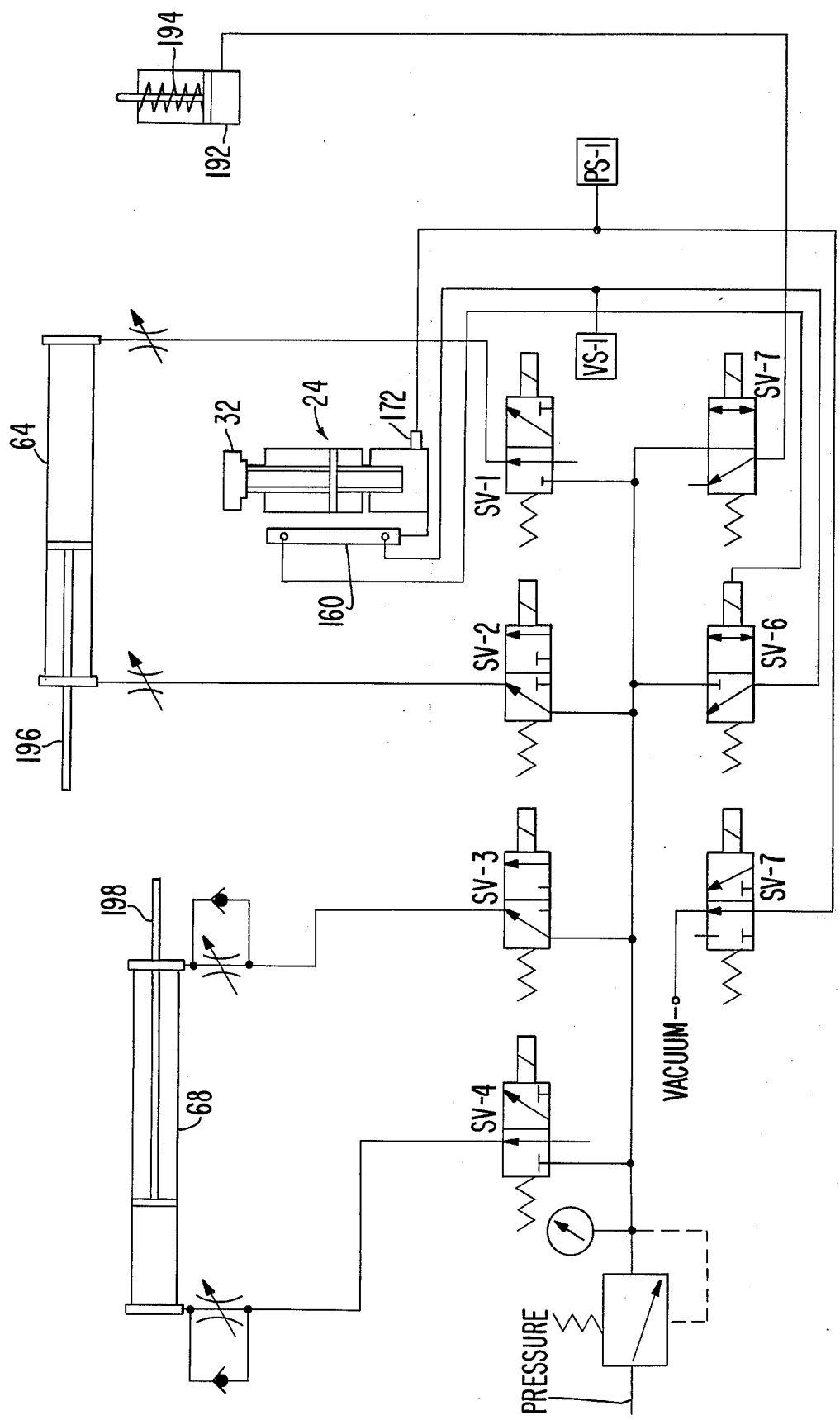
FIG. 10 is a schematic illustration of the pneumatic system of the present invention.

The slide or rail assembly is shown in greater detail in FIG. 9. Arm 66 is carried on the piston 196 of the pneumatic actuator 64 and the arm 70 is carried on piston 198 of the pneumatic actuator 68.

Outward progress of the piston 196 is curtailed by limit switch 200 mounted to the slide or rail 60. This switch is coupled to the pneumatic actuator 64 to stop it when the arm 66 reaches this point. A similar limit switch 202 mounted to rail 62 is provided to stop outward progress of the piston 198. The arms 66 and 70 each have a small hole 204 for engagement with a pin 206 (FIG. 8) located on the inner slides.

The outer slide mechanisms 54 and 58 are transported by carriers 205 and 207, respectively. These are provided with holes 208 for engaging pins located in the outer slides. These carriers also function to engage the limit switches 200 and 202 respectively.

FIG. 10 is a schematic illustration of the pneumatic system employed in the subject invention.

What is claimed is:

1. Apparatus for transporting a disc-like workpiece to and from a work station comprising:
    a transport mechanism including an inner and an outer slide which are slidably movable with respect to each other and which each include means to engage a workpiece carried thereon;
    means for slidably moving siad inner slide to a position to accept workpieces thereon, while maintaining said outer slide in a stationary position;
    means for transferring a workpiece to said inner slide;
    means for slidably moving said inner slide to a position whereby said workpiece carried thereon is transferred to said outer slide by bringing the workpiece into engagement with said workpiece engagement means of said outer slide;
    means for slidably moving said outer slide to a position whereby said workpiece carried thereon is at the work station; and
    means for transferring said workpiece from said outer slide to said work station.

2. Apparatus as in claim 1 wherein said workpiece engagement means for said inner and outer slides includes means for engaging multiple-sized and shaped workpieces.

3. Apparatus for transporting thin workpieces to and from a processing area comprising:
    a supply storage cartridge containing a plurality of stacked, spaced-apart workpieces to be sequentially transported to the processing area;
    a receiving storage cartridge for accepting the workpieces after being processed at said processing area;
    a supply transport mechanism to convey wafers from said supply cartridge to the processing area and including inner and outer supply slides which are slidably moveable with respect to each other and which each includes means to engage a workpiece carried thereon;
    a receiving transport mechanism to convey workpieces from said processing area after processing thereof to said receiving cartridge and including inner and outer receiving slides which are slidably movable with respect to each other and which each includes means to engage a workpiece carried thereon;
    means for coupling said outer supply slide with said inner receiving slide and means for coupling said inner supply slide with said outer receiving slide so that the resulting coupled slide pairs move in unison;
    means for slidably moving said inner supply slide to a position to accept workpieces thereon from said supply cartridge and for moving said outer receiving slide to a position to accept workpieces thereon from the processing area;
    means for transferring a workpiece from said supply cartridge onto said inner supply slide and means for transferring any processed workpiece onto said outer receiving slide;
    means for slidably moving said inner supply slide back to a position whereby said workpiece carried thereon is transferred to said outer supply slide by bringing the workpiece into engagement with said workpiece-engagement means of said outer slide and for moving said outer receiving slide back to a position whereby a processed workpiece thereon is transferred to said inner receiving slide by bringing the processed workpiece into engagement with said workpiece-engagement means of said inner receiving slide;
    means for slidably moving the outer supply slide to a position whereby said workpiece carried thereon is at the processing area and for moving the inner receiving slide to a position whereby said processed workpiece carried thereon can be transferred to said receiving storage cartridge; and
    means for transferring said workpiece from said outer supply slide to the processing area and means for transferring said processed workpiece from said inner receiving slide to said receiving storage cartridge.

4. Apparatus as in claim 3 for transporting a disc-like workpiece to and from a work station comprising;
    a transport mechanism including an inner and an outer slide which are slidably movable with respect to each other and which each include means to engage a workpiece carried thereon;
    means for slidably moving said inner slide to a position to accept workpieces thereon, while maintaining said outer slide in a stationary position;
    means for transferring a workpiece to said inner slide;
    means for slidably moving said inner slide to a position whereby said workpiece carried thereon is transferred to said outer slide by bringing the workpiece into engagement with said workpiece engagement means of said outer slide;
    means for slidably moving said outer slide to a position whereby said workpiece carried thereon is at the work station; and
    means for transferring said workpiece from said outer slide to said work station.

5. Apparatus as in claim 3 wherein said means for transferring a workpiece onto said inner supply slide comprises means for incrementally lowering said supply storage cartridge to deposit a workpiece upon said inner supply slide.

6. Apparatus as in claim 5 wherein said means for transferring said processed workpiece from said inner receiving slide to said receiving storage cartridge comprises means for incrementally raising said receiving storage cartridge to lift-off a processed workpiece on said outer receiving slide.

7. An automated system for transporting disc-shaped workpieces to and from a processing station comprising:
- a plurality of supply receptacles each containing a plurality of workpieces to be processed;
- a designated supply area at which a single supply receptacle is positioned at a time;
- a plurality of empty receiving receptacles for accepting workpieces which have been processed;
- a designated receiving area at which a single receiving receptacle is positioned at a time to accept processed workpieces;
- means for automatically and sequentially transporting all of the workpieces from a supply receptacle located in said workpiece supply area to the processing station to be processed and thereafter to a receiving receptacle located at said workpiece receiving area;
- first means for automatically cycling a filled supply receptacle to said designated supply area when a supply receptacle thereat is exhausted of workpieces; and
- second means for automatically cycling an empty receiving receptacle to said designated receiving area when a receiving receptacle thereat is filled with workpieces.

8. An automated system as in claim 7 wherein said first and second means comprises a rotatable carousel platform.

9. Apparatus for transporting thin workpieces to and from a workpiece processing area comprising:
- a first slide for receiving a workpiece thereon to be processed;
- a receptacle for holding said thin workpieces in a vertical stack, where each workpiece is horizontally oriented and spaced-apart from adjacent workpieces;
- means for incrementally lowering said receptacle to deposit workpieces on said first slide;
- means for moving said first slide to transport said workpiece thereon to an intermediary position;
- a second slide; and
- means for moving said second slide mechanism to transport said workpiece from said intermediary position to the workpiece processing area.

10. Apparatus for transporting thin workpieces to and from a workpiece processing area comprising:
- a supply transport mechanism comprising a first supply slide for receiving a workpiece thereon to be processed, and a second supply slide;
- a receiving transport mechanism comprising a first receiving slide and a second receiving slide for accepting processed wafers thereon from the processing area;
- means for coupling said first supply slide and said second receiving slide and for coupling said second supply slide with said first receiving slide;
- means for moving said first supply slide to transport said workpiece thereon to a first intermediary position and for moving said second receiving slide to transport said processed workpiece thereon to a second intermediary position; and
- means for moving said second supply slide to transport said workpiece from said first intermediary position to the workpiece processing area and for moving said first receiving slide to transport said processed workpieces from said second intermediary position.

11. Apparatus as in claim 10 including at least one supply receptacle for holding a plurality of workpieces to be processed in a vertical stack and including at least one receiving receptacle for accepting processed workpieces, and wherein each workpiece is horizontally oriented and spaced-apart from adjacent workpieces in said receptacles.

12. Apparatus as in claim 11 including means for incrementally lowering said supply receptacle to deposit workpieces on said first supply slide and means for incrementally raising said receiving receptacle to remove processed workpieces from said first receiving slide.

13. Apparatus as in claim 12 including means for automatically replacing a supply receptacle which has been emptied with a filled supply receptacle and means for automatically replacing a receiving receptacle which has been filled with an empty receptacle.

14. Apparatus as is claim 13 wherein said lowering means comprises a shaft and means for lowering and raising said shaft and wherein said automatic replacing means comprises:
- a. a platform having a plurality of apertures; said apertures permitting the passage of said shaft therethrough when said shaft is raised and lowered;
- b. a saddle removably mounted over at least selected ones of said apertures, each of said saddles supporting thereon a workpiece receptacle whereby said saddle and said workpiece receptacle is raised and lowered by said shaft when aligned therewith; and
- c. means for rotating said platform to sequentially align each of said workpiece receptacles with said shaft.

* * * * *

UNITED STATES PATENT AND TRADEMARK OFFICE
CERTIFICATE OF CORRECTION

PATENT NO. : 3,921,788
DATED : November 25, 1975
INVENTOR(S) : Glenn A. Roberson, Jr., Robert I. Beaver II and Edward L. Kelly It is certified that error appears in the above—identified patent and that said Letters Patent are hereby corrected as shown below:

Column 3, line 22, delete "wafer" and insert --wafers--.

Column 6, line 21, delete "about" and insert --above--.

Column 6, line 48, delete "rigde" and insert --ridge--.

Column 9, line 33, delete "siad" and insert --said--.

Column 9, line 63, delete "moveable" and insert --movable--.

Signed and Sealed this

Tenth Day of August 1976

[SEAL]

Attest:

RUTH C. MASON
Attesting Officer

C. MARSHALL DANN
Commissioner of Patents and Trademarks